United States Patent [19]
King

[11] Patent Number: 6,161,733
[45] Date of Patent: Dec. 19, 2000

[54] SHUTTER VALVE DISPENSER

[76] Inventor: Kenyon M. King, 8739 Lion St., Rancho Cucamonga, Calif. 91730

[21] Appl. No.: 09/050,208

[22] Filed: Mar. 30, 1998

[51] Int. Cl.⁷ ........................................................ B67D 5/44
[52] U.S. Cl. .......................... 222/380; 222/450; 222/451
[58] Field of Search .................................... 222/372, 380, 222/383.1, 450, 451

[56] References Cited

U.S. PATENT DOCUMENTS

| | | | |
|---|---|---|---|
| 707,767 | 8/1902 | Ferrari | 222/451 X |
| 1,469,879 | 10/1923 | Bott | 222/450 X |
| 2,110,328 | 3/1938 | Drese | 222/380 X |
| 2,388,805 | 11/1945 | Stahl | 222/372 |
| 2,510,576 | 6/1950 | Herbold | 222/383.1 X |
| 4,012,889 | 3/1977 | Chung | 222/451 X |
| 4,060,183 | 11/1977 | Puurunen | 222/450 X |
| 4,066,107 | 1/1978 | Karp et al. | 222/450 X |
| 4,109,835 | 8/1978 | Castro | 222/451 X |
| 4,623,008 | 11/1986 | Shibata et al. | 222/450 |

*Primary Examiner*—Kenneth Bomberg
*Attorney, Agent, or Firm*—Leo R. Carroll

[57] ABSTRACT

This computer controlled positive displacement shutter valve dispenser comprises a piston housing, pistons, shutter valves, linear or rotational drive servomechanisms, and a computer controller. The piston housing configuration can be cylindrical or non-cylindrical. Either configuration can have multiple input or output ports selected by the travel of the shutter valve. In addition the non-cylindrical configuration can have a multitude of shapes, allowing for single piston or multiple piston designs. The multiple piston arrangement can have equal or nonequal displacements from the pump cavity of each piston. The computer controls all aspects of the dispenser, including the forward and retract distance, speed and timing of the piston and shutter valves. The amount dispensed can vary between the maximum volume of the pump cavity to a small fraction of its volume as set by the resolution of the controller and linear drive mechanism.

11 Claims, 13 Drawing Sheets

SHUTTER VALVE DISPENSER

BACKGROUND OF THE INVENTION

1. Technical Field This invention relates generally to improved systems for pumping semi-fluids, and particularly to computer controlled positive displacement pumps utilized in dispensing medicine and food products of various viscosity.

2. Background Art

Positive displacement pumps and motors using shutters for various valving functions are well known. Examples of such pumps include:

Bordini, in U.S. Pat. No. 4,759,695, describes a pumping unit for the filling of foodstuffs in containers in packaging machines. The conical shutter of the pumping unit, selectively connecting the pumping piston to the product intake duct and to the product delivery duct, is movable backwards from its seat.

In U.S. Pat. No. 5,141,408, Conrad et al disclose a product pumping device in which a dual piston alternately reciprocating pumping apparatus uses a precompression stroke. A reciprocating shutter plate is positioned between each feed cylinder and the hopper to regulate flow into the feed cylinders in a timed fashion. These shutter plates function as an intake valve for the feed cylinders. Separate discharge outlets positioned in the upper portion of each feed cylinder are not directly closed at any time during operation.

Garcia, in U.S. Pat. No. 5,186,368, describes a shutter for the outlet channel of a dispenser head for semi-liquid substances. The shutter is made of a resiliently deformable material and is engaged in a housing provided in the dispenser head so that the slot communicates with the outlet channel, and the head is in sealed contact with a portion of the inside surface as well as at least one side of the shutter side wall.

While development of such devices has continued, they nevertheless have various limitations relating to complexity, reliability, cost, and ease of manufacture, particularly in such devices to be used for food or medicinal dispensing.

SUMMARY OF THE INVENTION

A computer controlled positive displacement shutter valve dispenser comprises a piston housing, pistons, shutter valves, linear drive mechanisms, and a computer controller. The piston housing configuration can be cylindrical or non-cylindrical. Either configuration can have multiple input or output ports selected by the linear travel of the shutter valve. In addition the non-cylindrical configuration can have a multitude of shapes, allowing for single piston or multiple piston designs. The multiple piston arrangement can have equal or non-equal displacements from the pump cavity of each piston. This computer controlled positive displacement shutter valve dispenser can be constructed with any of these configurations using either rotary or linear construction.

The computer controls all aspects of the dispenser, including the forward and reverse distances, velocity, and timing of the pistons and shutter valves. The dispense amount may vary between the maximum volume of the pump cavity to a small fraction of its volume as set by the resolution of the controller and linear drive mechanism.

The positive displacement shutter valve dispenser can have any shape that the application requires. A rectangular shape dispenser, molded on or attached to a container, filled with a flowable material, makes possible a very large input port. This reduces the force required of the retracting piston to bring the flowable fluid into the dispensing pump cavity, thus allowing gravity to help fill the cavity. This also allows reduced dimensional tolerances between the piston and housing, and reduced requirements on the nozzle to prevent sucking of air during retraction of the piston.

The disclosed invention describes a dispensing pump that has a relatively large inlet which may be closely disposed adjacent to the outlet of a product container. The piston can have multiple sections, which in conjunction with a matched housing, permits:

a) dispensing of multiple products;
b) even dispensing through multiple hoses or nozzles;
c) even dispensing over a broad area; or
d) dispensing through unequal size pistons to provide uneven dispensing to meet specific dispensing applications.

The shutter valve dispenser can be constructed using linear piston and/or shutter valve motion, or rotary piston and shutter valve motion. The shutter valve can be as simple as a flat plate to control the input or output ports or a more complex sleeve shutter valve to allow the selection of input ports and output ports based on linear or rotary travel. Any number of shutter valves can be employed as required to control different flowable materials.

In some applications a nozzle is required to act as a one-way valve on the output port and to control dripping from the output port. In other applications the shutter valve is designed to open and close the input and output ports as it travels. In other designs, a separate shutter valve controls the input and output port.

In the medical, food and other granular dispensing industries, there are needs for a computer controlled positive displacement dispensing pump, that can accurately control rate and volume portioning of the particulate articles being dispensed. The desired dispensing pump requires control of all aspects of pumping and dispensing, including: rate and volume of the recharge or intake stroke, and discharge cycle, timing, opening size and rate of the opening and closing of the control valves. This disclosure describes a pump that dispenses controlled amounts of material by independently controlling the stroke of a pump's piston, and that of a separate shuttle plate by servomechanism means. It is also a requirement, particularly in the restaurant or fast food industry, that cleaning of the pump is to be as simple is possible and that individual country specifications, such as those of the National Sanitation Foundation in the U.S., are met. A reduced number of parts in contact with the material being pumped are made possible by having the linear drives located remotely from the food contact area. There are also requirements that some material items to be dispensed must be held at a controlled environment.

With servomechanism control of the pistons displacement, and servo control of the shutter valve, complete control of the timing of the dispense, the dispense amount, the rate of dispensing, dispense opening, dispense cut off, the timing of the intake cycle, the intake rate and intake volume are controllable and can be changed at any time.

It is a principal object of this invention, therefore, to provide a computer controlled positive displacement pumping device which can accurately dispense controlled quantities of flowable product through pre-selected inlet and outlet ports.

It is an additional object of the invention to provide a pumping device having piston and shutter valves that may be servo controlled in both positional displacement and linear velocity.

It is another object of the invention to provide a pumping device having a minimum number of parts in contact with a flowable food or medicinal product.

It is a further object of this invention to provide a dispensing pump which may be inexpensively manufactured, is structurally rigid and safe, and can be easily installed in existing food facilities.

These and other objects of the present invention will become readily apparent upon further review of the following specification and drawings. The above and other objects, features and advantages of the present invention will become more apparent from the following description when making reference to the detailed description and to the accompanying sheets of drawings.

BRIEF DESCRIPTION OF DRAWINGS

FIG. 2B depicts a side elevation view of the same fourth embodiment of my dispensing system.

DESCRIPTION OF THE PREFERRED EMBODIMENT

Figures 1A, 1B, 1C, 1D, 1E:
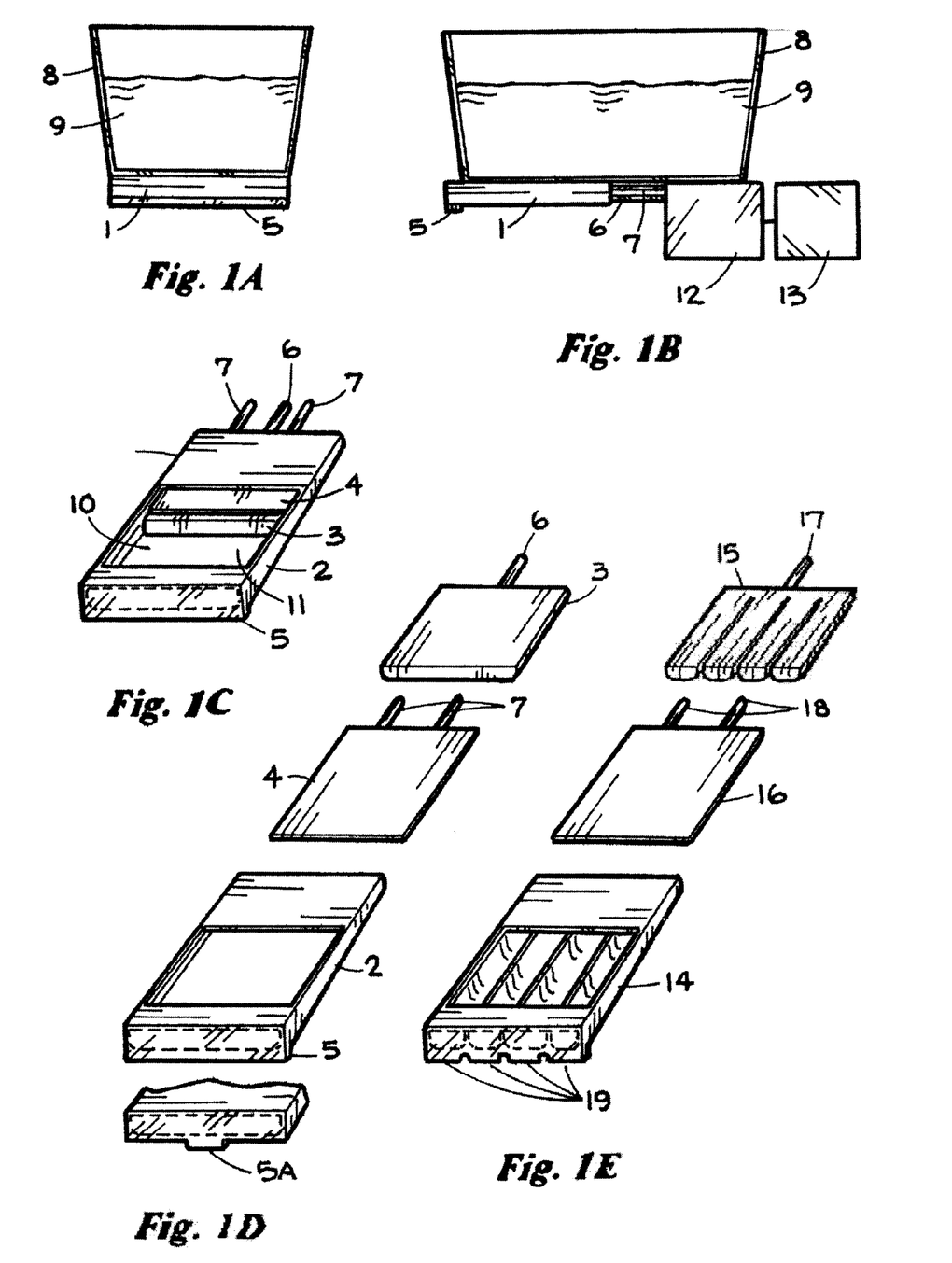
FIG. 1A shows an end elevation end view of a first embodiment of my dispensing system.
FIG. 1B presents a side elevation view of the same first embodiment of my dispensing system.
FIG. 1C illustrates a perspective view of an assembled first dispenser removed from FIG. 1B.
FIG. 1D presents exploded perspective views of the removed first dispenser of FIG. 1C with two outlet port sizes.
FIG. 1E presents an exploded perspective view of a second dispenser embodiment having multiple pistons.

FIG. 1A shows an end view of a first embodiment of my dispensing system, having container means 8 holding a flowable material 9, with first dispenser means 1 and outlet port means 5 attached below. FIG. 1B shows a side view of the same embodiment. FIG. 1C illustrates a perspective view of an assembled first dispenser means 1 removed from FIG. 1B. FIG. 1D presents an exploded perspective view of the same dispenser means as shown on FIG. 1C, with said dispenser means having two outlet port sizes.

Referring to the above figures, dual drive mechanism means 12 are connected to piston means 3 and to shutter valve means 4 through piston drive means 6 and shutter valve drive means 7, respectively. Both piston means 3 and shutter valve means 4 are disposed within said first dispenser means 1. Linear motion of each dual drive mechanism means 12 is independently governed by controller means 13. The flat rectangular configuration shown allows the large input port 10, to be the same width as that of container 8. The short travel of the flowable material into the dispenser's pumping cavity 11, and the large area of the input port 10, allows gravity to add to the force produced by the retracting piston so as to provide a rapid recharge of the dispenser FIG. 1D shows the individual parts of a dispenser means exploded from the piston housing 2. The parts include piston means 3, shutter valve means 4, piston drive means 6 and shutter valve drive means 7. The drive means 6 and 7 are connected to the dual linear drive mechanism 12 that is typically controlled by a controller means 13 having an internal computer. Also shown in FIG. 1D is an alternate output port means 5a which has its width narrowed in comparison with the wide port of FIG. 1C.

FIG. 1E presents a second exploded embodiment of the rectangular dispenser means of FIG. 1D. Here, a multiple piston design is utilized to obtain equal or piston-sized proportional outputs from the multiple output ports. Housing 14 is divided into four half cylinders in order to receive the four pistons, and the four output ports are shown as 19. The piston's linear drive means is shown as 17 and the shutter valve drive means as 18. Both drive means 17 and 18 are connected to a linear drive mechanism 12 that is controlled by the controller 13.

Figure 2A:
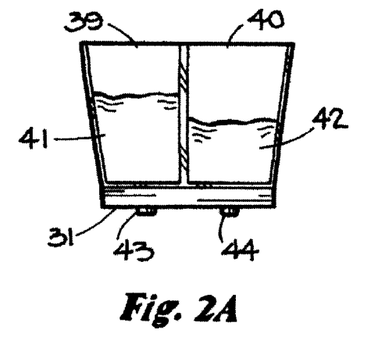
FIG. 2A shows a front elevation end view of a third embodiment of my dispensing system showing dual containers and exit ports.
Figure 2B:
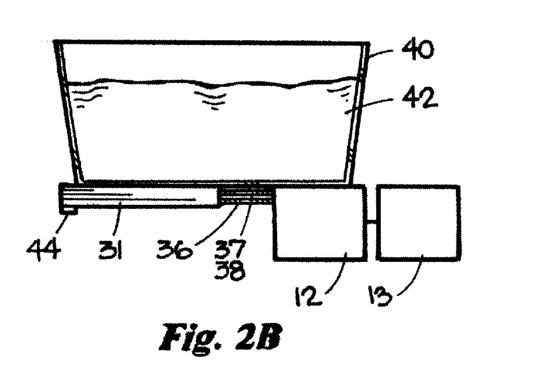
FIG. 2B presents a side elevation view of the same embodiment of my dispensing system showing three driving rods.
Figure 2C:
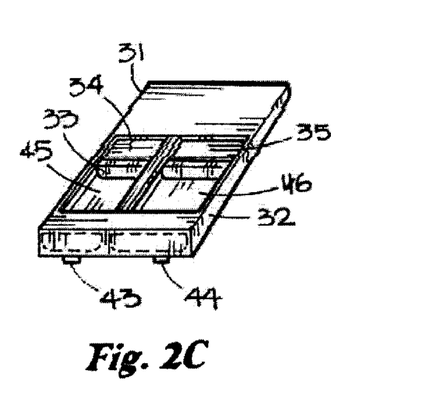
FIG. 2C illustrates a perspective view of an assembled third dispenser removed from FIG. 2B.
Figure 2D:
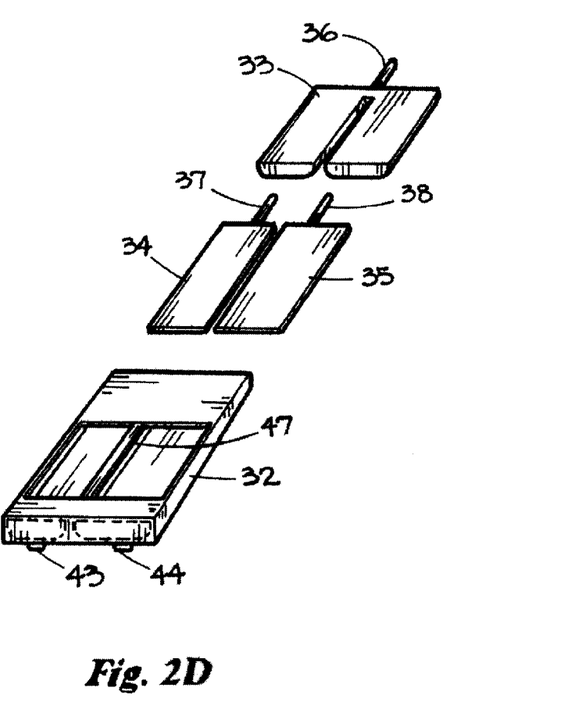
FIG. 2D presents an exploded perspective view of the third dispenser of FIG. 2C, showing a dual piston and two independent shutter valves.
Figure 3A:
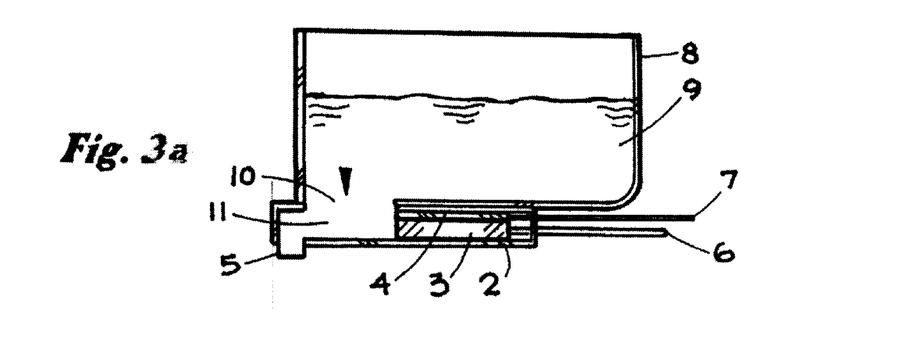
FIG. 3 shows the sequential positional operation of a shutter valve dispenser similar to that of FIG. 1.
Figure 3B:
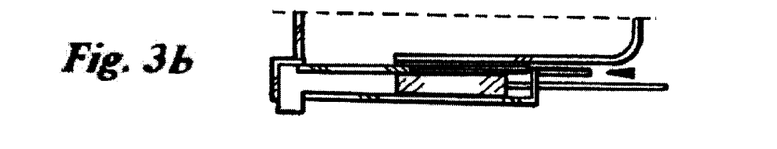
Figure 3C:
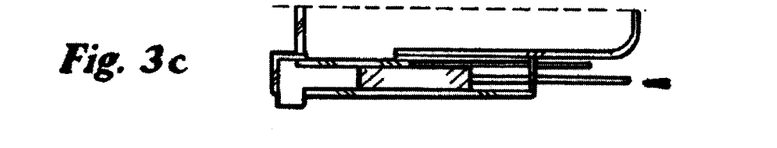
Figure 3D:
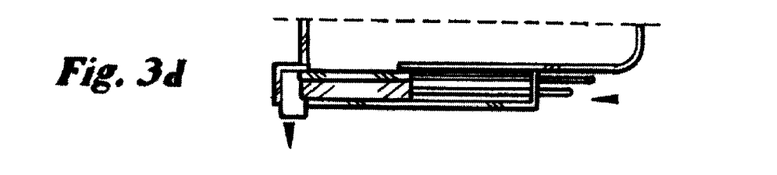
Figure 3E:
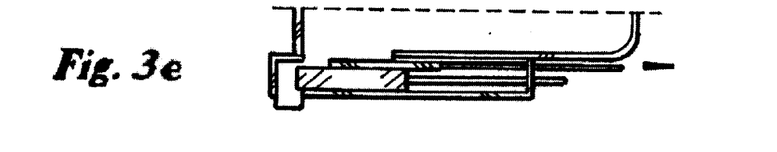
Figure 3F:
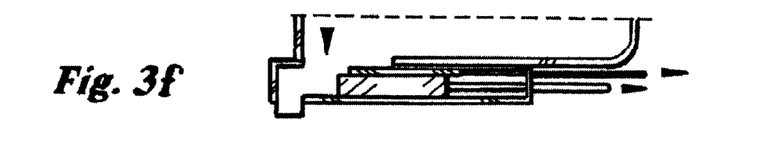
Figure 3G:
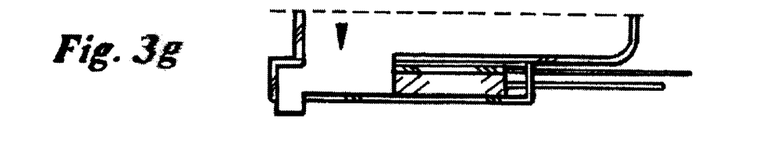

FIG. 2A shows a front elevation end view of a second embodiment of my dispensing system having dual containers 39 and 40, which hold flowable materials 41 and 42. FIG. 2B depicts a side elevation view of the same second embodiment of my dispensing system. FIG. 2C illustrates a perspective view of an assembled second dispenser means removed from FIG. 1B. FIG. 2D presents an exploded perspective view of the second first dispenser of FIG. 1C.

Referring to the above figures, a second rectangular configuration of the shutter valve dispenser 31, uses two input shutter valves 34 and 35, to control the dispense from ports 43 and 44. The piston 33 is a multiple piston fitting a housing 32. The two shutter valves 34 and 35 are driven by separate linear drives 37 and 38, using separate linear mechanisms. These valves control the closure of ports 45 and 46, and thus the dispense from 43 and 44. If either shutter valve 34 or 35 is always retracted then there will not be a dispense from its output port as the piston 33 is driven forward. The separator 47 is required to keep the two products 41 and 42 isolated.

It will be recognized that another approach could have one shutter valve and two pistons, each piston being driven from separate linear drive mechanisms, under the control of controller 13.

FIG. 3 shows the sequential operation of shutter valve dispenser 1, for FIGS. 1 and 2. FIG. 3a, shows a side view of a container 8, flowable material 9, and attached positive displacement shutter valve dispenser 1. Also shown are the housing 2, piston 3, shutter valve 4, input port 10, pumping cavity 11, and output port 5.

The progressive operational steps are as follows;
 a) With piston 3, and shutter valve 4 retracted the flowable material 9, flows through port 10, into cavity 11.
 b) Shutter valve 3 is pushed forward, closing port 10.
 c) Piston 2 is pushed forward forcing the material 9 in the cavity 11, to be dispensed through port 5.
 d) Piston 3, is pushed all the way in (as set by the controller) forcing the specified amount of flowable material 9, in cavity 11, out through port 4.
 e) The shutter valve 4 is retracted.
 f) Piston 3, is retracted, with the help of gravity, pulling the flowable material 9, by way of port 10 into the pumping cavity 11.
 g) With the piston 3, and shutter valve 4, fully retracted, (as set by controller) the pumping cavity is at its maximum and is ready for the next dispense.

Figure 4A:
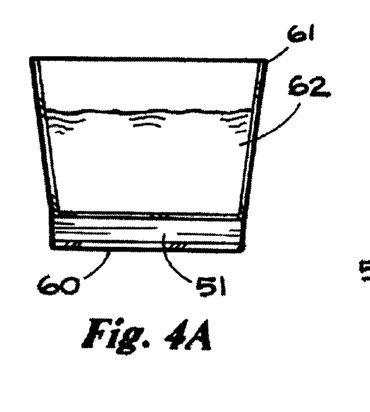
FIG. 4A shows a front elevation end view of a fourth embodiment of my dispensing system.
Figure 4B:
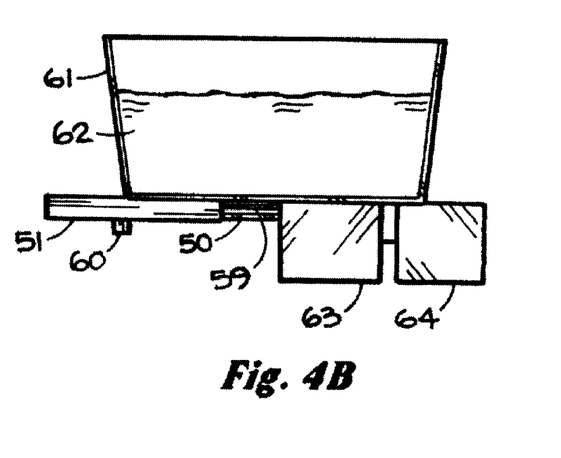
FIG. 4C illustrates a perspective view of an assembled first dispenser removed from FIG. 4B.
FIG. 4D presents an exploded perspective view of the dispenser of FIG. 4C, showing a sleeve shutter valve.
Figures 4C, 4D:
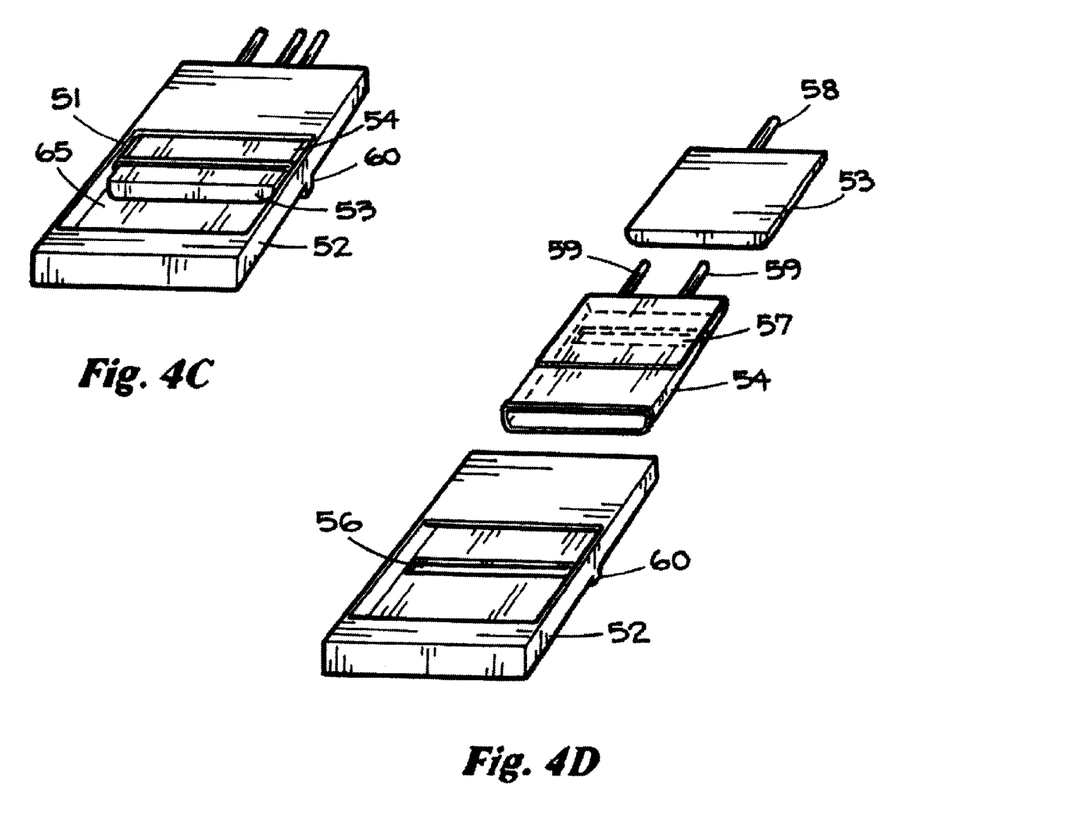
Figure 5A:
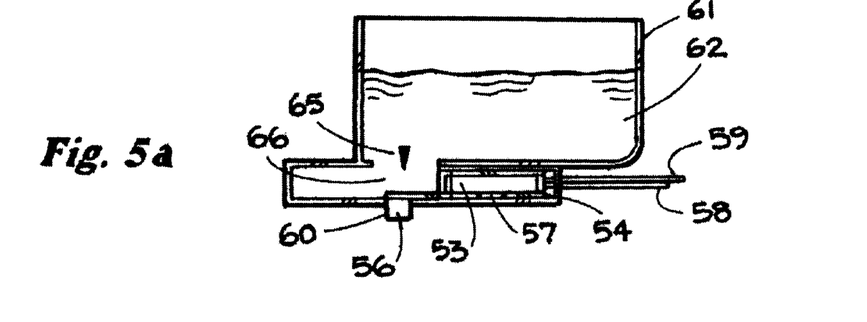
FIG. 5 shows a typical sequential positional operation of a shutter valve dispenser as depicted in FIGS. 4.
Figure 5B:
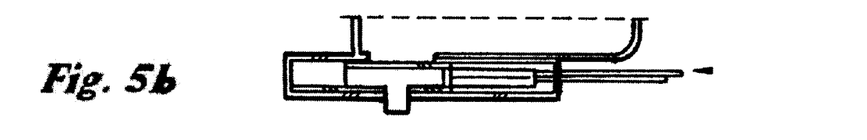
Figure 5C:
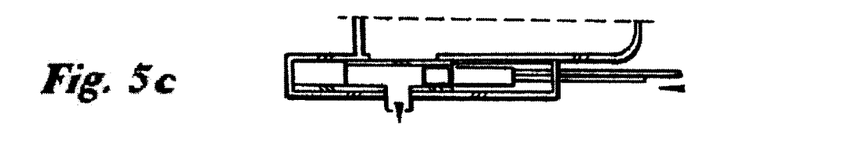
Figure 5D:
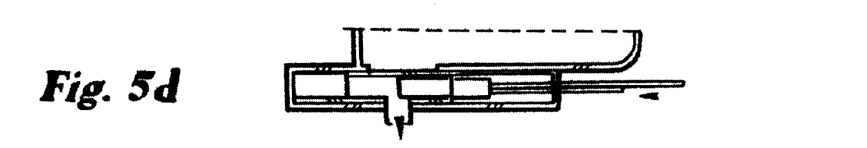
Figure 5E:
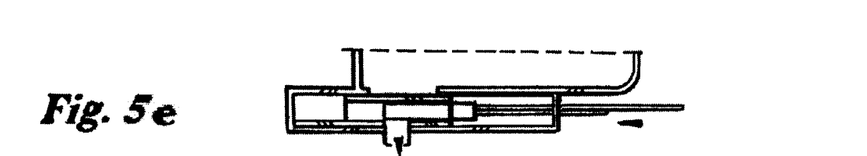
Figure 5F:
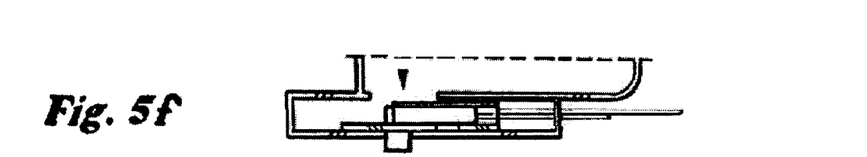
Figure 5G:
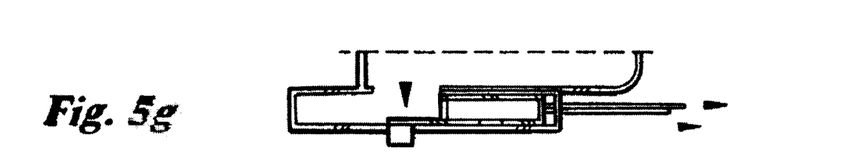

FIGS. 4A and 4B show a front end and side elevations of a fourth embodiment of my dispensing system. FIG. 4C illustrates a perspective view of an assembled first dispenser 51 removed from FIG. 4B, while FIG. 4D presents an exploded perspective view of the dispenser of FIG. 4C. In this embodiment, the sleeve shutter valve 54 not only controls the input port 65, but also the output port 60. This is accomplished by having the sleeve shutter valve 54, configured as a sleeve around the piston 53, the slots 57 in the sleeve shutter valve, and the corresponding slots 56 in the housing 52, control the opening of port 60. It is obvious that the slots on the piston and the slots on the housing must align to open the port 60. More than one port can be controlled by placing the slots 57, on the shutter valve 54, and slots 56, on the housing 52 at specified locations so that they align at specific linear travel distances of the sleeve shutter valve 54.

FIG. 5 shows a typical sequential positional operation of a shutter valve dispenser as depicted in FIGS. 4. The steps in this sequence are:
 a) With the piston 53, and sleeve shutter valve 54 fully retracted the flowable material 62, in container 62, flows through port 65, into the pumping cavity 66. Port 60 is closed by the sleeve shutter valve 54 at slot 57.
 b) Sleeve shutter valve 54 is pushed forward closing port 65, the slot 57, in sleeve shutter valve 54, is now opposite the slot 56, in the housing 52, opening port 60.
 c) Piston 53 is pushed forward (to the left in this drawing) forcing the flowable material in pump cavity 66, out through port 60.
 d) Piston is near the end of travel.
 e) Piston is at the end of travel.
 f) Sleeve shutter valve 54 is retracted, closing port 60. The flowable material 62 is pulled with the retraction of piston 53 and the help of gravity, into cavity 66.
 g) Piston 53, and sleeve shutter valve 54, are fully retracted, cavity 66 is at its maximum and ready for next dispense.

Figure 6A:
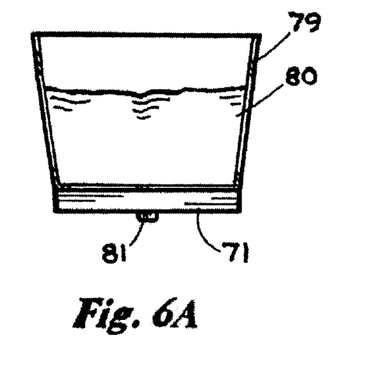
FIG. 6A shows a front elevation end view of a fifth embodiment of my dispensing system.
Figure 6B:
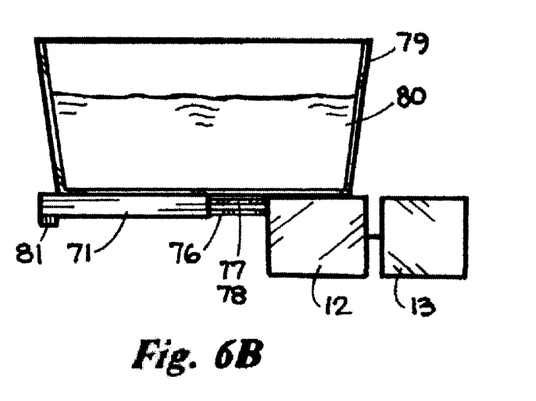
FIG. 6B depicts a side elevation view of the same fifth embodiment of my dispensing system.
Figures 6C, 6D:
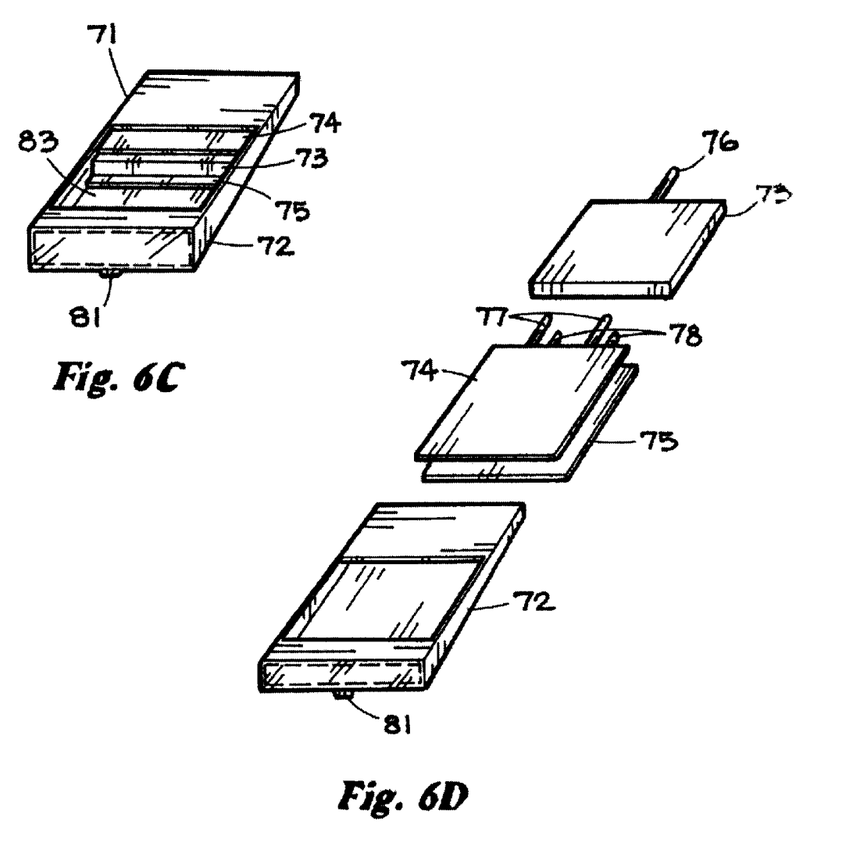
FIG. 6C illustrates a perspective view of the dispenser removed from FIG. 6B.
FIG. 6D presents an exploded perspective view of the dispenser of FIG. 6C, showing a two shutter valve arrangement.
Figure 7A:
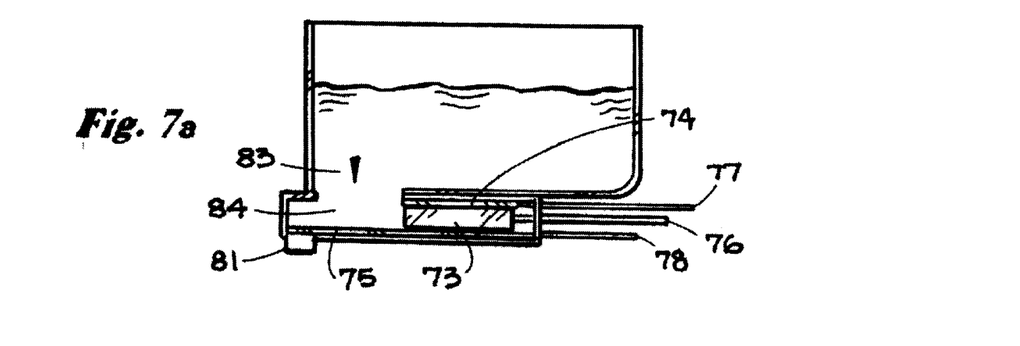
FIG. 7 shows a sequential positional operation of a shutter valve dispenser as depicted in FIG. 6.
Figure 7B:
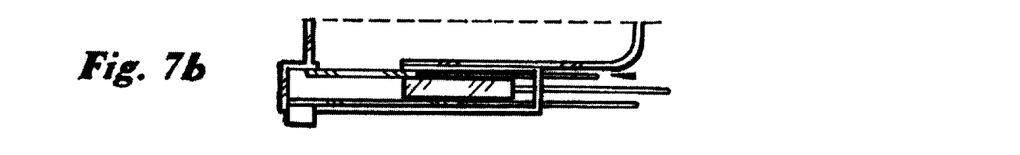
Figure 7C:
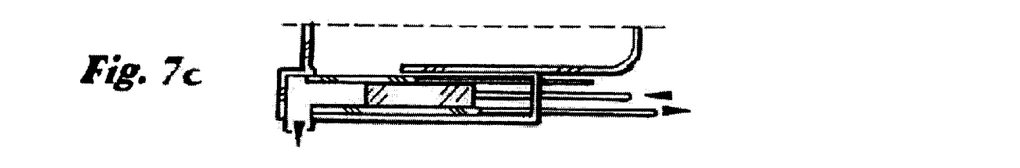
Figure 7D:
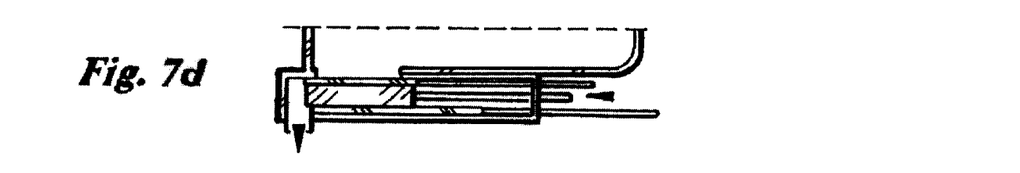
Figure 7E:
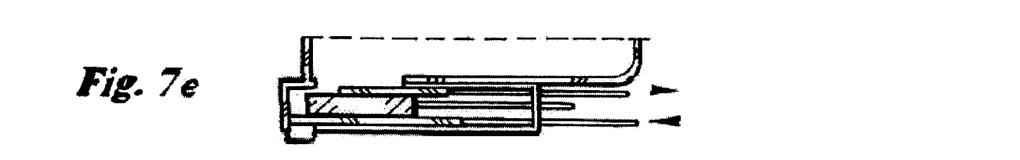
Figure 7F:
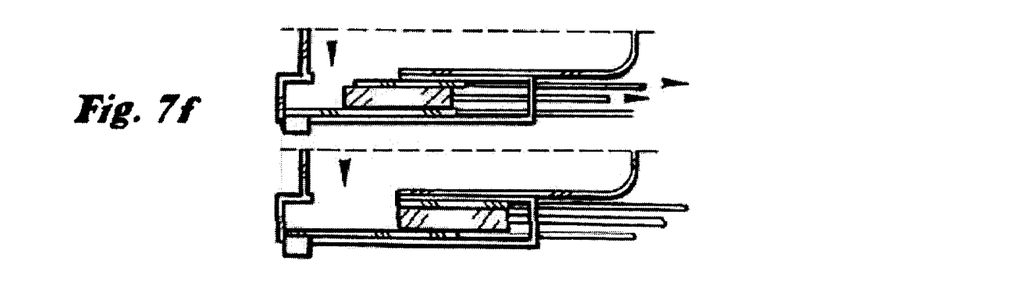
Figure 8A:
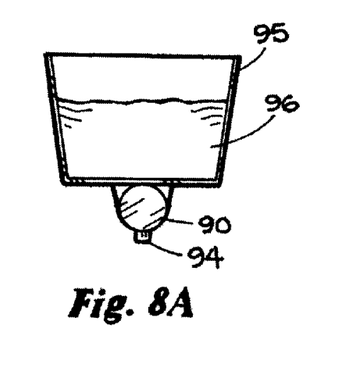
FIG. 8 shows a cylindrical configuration of the valve dispenser which is configured similarly to the rectangular versions.
Figure 8B:
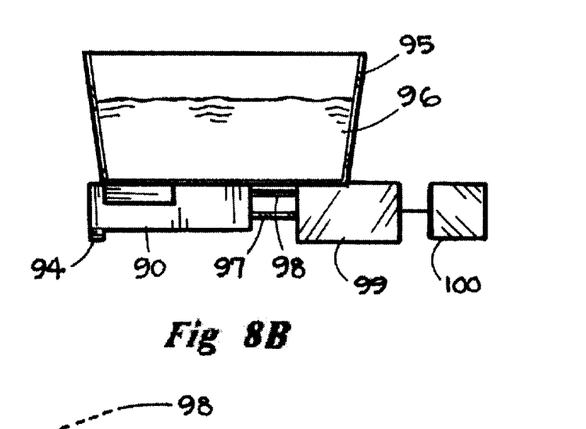
Figure 8C:
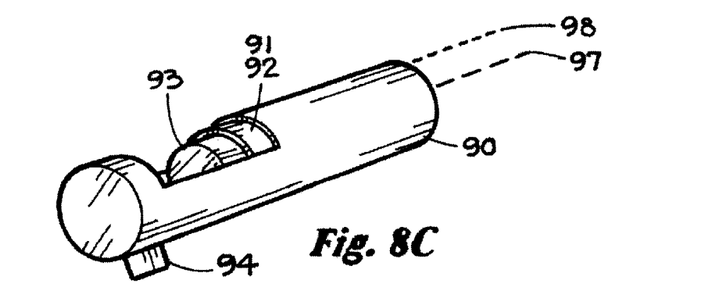
Figure 8D:
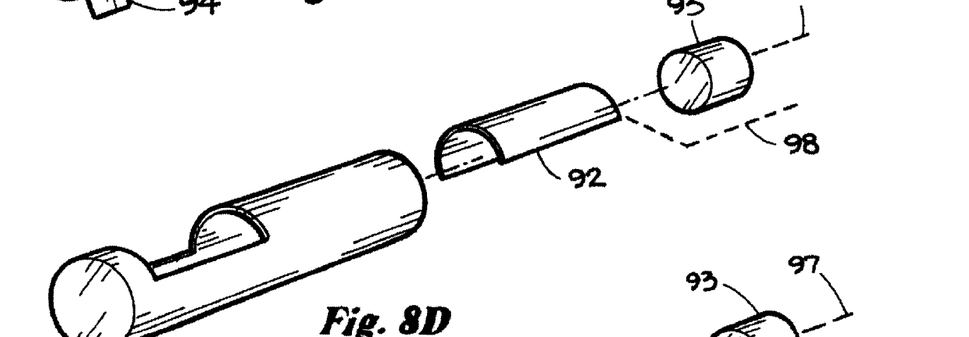
Figure 8E:
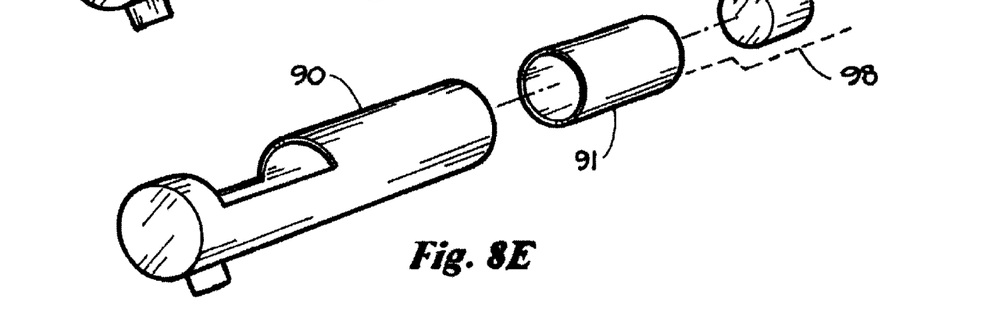

FIGS. 6A and 6B show front end and side elevations of a fifth embodiment of my dispensing system. FIGS. 6A and 6B show the positive displacement shutter valve dispenser as attached to a container 79, which contains the flowable material 80. The shutter valves 74 and 75 are driven by drive means 77 and 78, and the piston is driven by drive means 76. These drive means are attached to the linear mechanism 12, which is controlled by the controller 13. FIG. 6C illustrates a perspective view of an assembled dispenser 71 removed from FIG. 6B, while FIG. 6D presents an exploded perspective view of the dispenser of FIG. 4C. In this fifth embodiment, a positive displacement shutter valve dispenser uses two shutter valves 74 and 75, each being independently driven. Shutter valve 74 is used to control the input port 83, and shutter valve 75 is used to control the output port 81.

A similar configuration using two shutter valves is used to measure flowable material. This is accomplished by first filling the pump cavity with material, having the input shutter valve open, and the output shutter valve closed. Next, without moving the piston, the input shutter valve is closed. After closure, the material is dispensed by opening the output shutter valve. This may require that the output port to be as large as the input port. The piston is then used to control the volume of the pump cavity.

FIG. 7 shows a sequential positional operation of a shutter valve dispenser as depicted in FIG. 6. The steps in this sequence are:
 a) With the piston 73 and valve 74 retracted and shutter valve 75 pushed forward, closing the output port 81, the flowable material 80 in container 79, flows into the pump cavity 84 through the open port 83.
 b) Shutter valve 74 is pushed forward closing the input port 83.
 c) Shutter valve 75 is retracted, opening port 81, the piston is pushed forward dispensing the flowable material through the port 81.
 d) Piston 73 continues to push the flowable material 80 out through the port 81.
 e) Shutter valve 75 is pushed forward closing port 81. Shutter valve 74 is retracted opening port 83.
 f) As piston 73 is further retracted the flowable material 80 is drawn into the pump cavity 84.
 g) Piston 73 is fully retracted. The pump cavity is now at its maximum volume ready for the next dispense.

FIG. 8 shows a cylindrical configuration of the valve dispenser that has a configuration that is similar to that of the rectangular versions. This configuration operates in a manner identical with the rectangular versions. FIGS. 8A and 8B show a front and side view of the shutter dispenser 90 attached to a container 95 containing the flowable material 96. The piston and shutter valve are driven through drive means 97 and 98 by the linear mechanism 99, and are controlled by computer or controller 100. FIG. 8C shows the housing 90, shutter valve 91, and piston 93. The piston 93 and shutter valve 91 are driven from a linear mechanism 97 and 98 which is controlled by a computer or controller. FIG. 8D is identical to FIG. 8E, except that the shutter valve 92 is half round. FIG. 8C shows the assembled shutter valve dispenser 90 and output port 94.

Figures 9A, 9B:
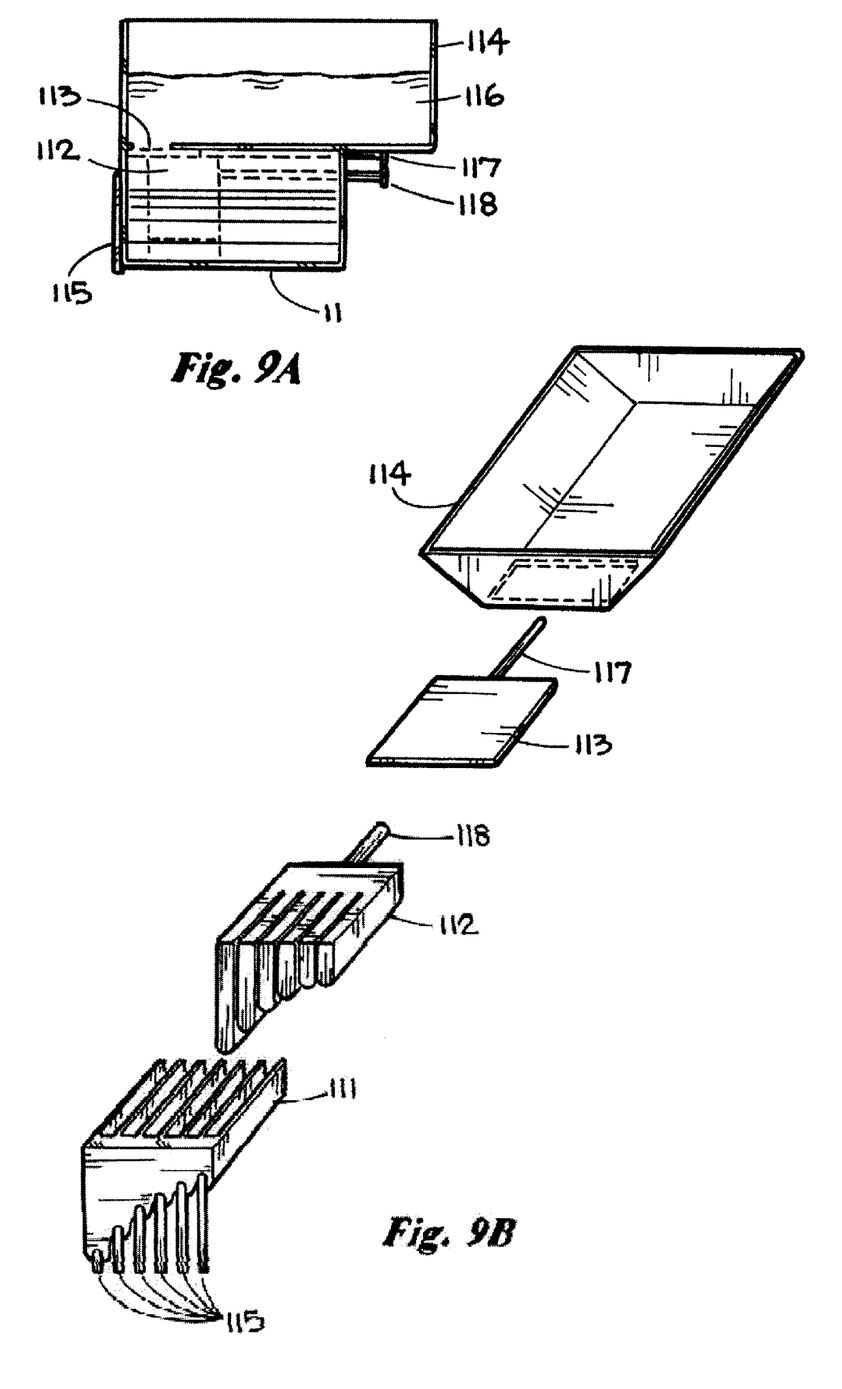
FIGS. 9A and 9B shows a multiple piston arrangement in which each piston has a different displacement.

FIG. 9A shows a multiple piston arrangement in which each piston has a different displacement. Uses for this configuration include the uneven dispensing of sauces over an area or through nozzles. This uneven dispensing is used for the presentation of food onto plates or containers, or applying sauces onto a rotating object, such as a pizza. Other applications include the dispensing of multiple products requiring different amounts such as mayonnaise, mustard and ketchup onto hamburger buns. FIG. 9B is an exploded view showing the housing 111, piston 112 and its drive means 118, the shutter valve 113 and its drive means 117, the container 114, holding the flowable material 116, the output ports 115, the linear drive mechanism 117, and the computer or controller 120.

Figure 10A:
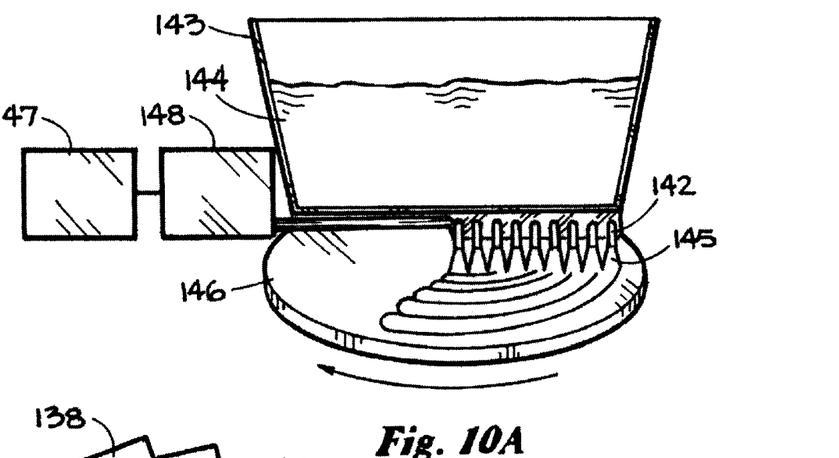
FIG. 10 shows a rotary version of the positive displacement shutter valve dispenser.
Figure 10B:
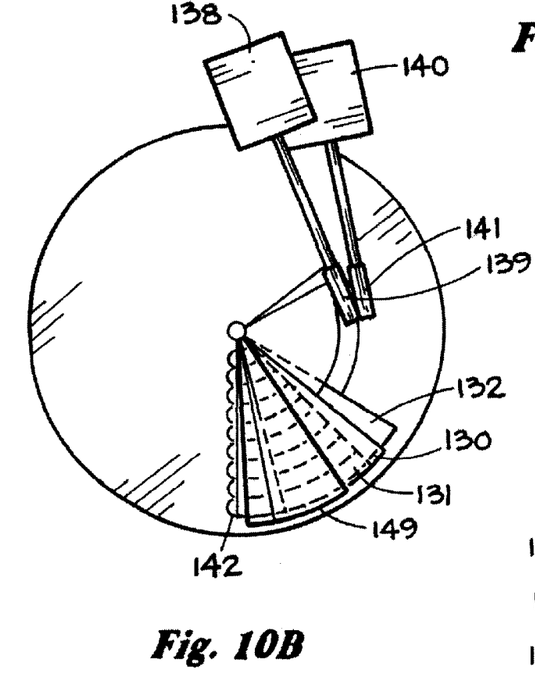
Figure 10C:
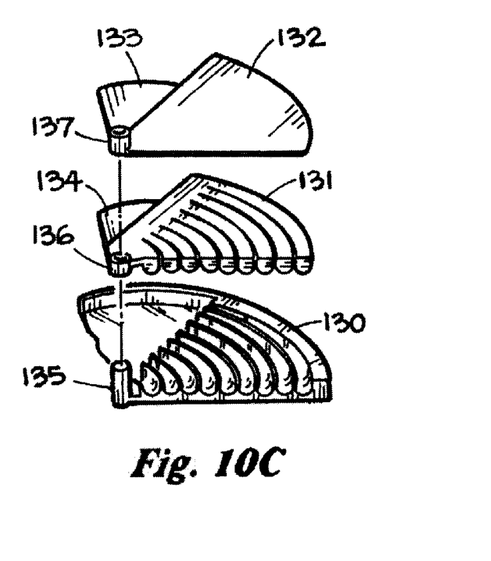

FIG. 10 presents a rotary version of the positive displacement shutter valve dispenser, in which the piston and shutter valve obtain rotary motion through a motor gear assembly 148. Applications of this configuration include the even or uneven dispensing of flowable material onto a rotating object such as a pizza, cake or pie, etc. FIG. 10A shows a side view of the rotary shutter valve dispenser placing uneven amounts of flowable material 145, onto rotating item 146. The uneven requirement is necessary because the inner ring requires less product than the outer ring to obtain an even layer of product. FIG. 10B is a view from the top of a container 143, in which the input port 149, piston 131, housing 130, shutter valve 132 and the rotary motor drive 148 are shown. Rotary motor drive 148 is depicted as a worm gear drive consisting of motors 138 and 140, driving worm gears 139 and 141. All mechanisms are controlled by controller 147. FIG. 10C is an exploded view of the housing 130, piston 131 and shutter valve 132. The housing contains the shaft 135 which aligns the piston's axis at 136 and the shutter valve axis at 137. The mating gears to the worm gear 139 and 141 are for the piston shown at 134 and for the shutter valve shown at 133.

Figure 11:
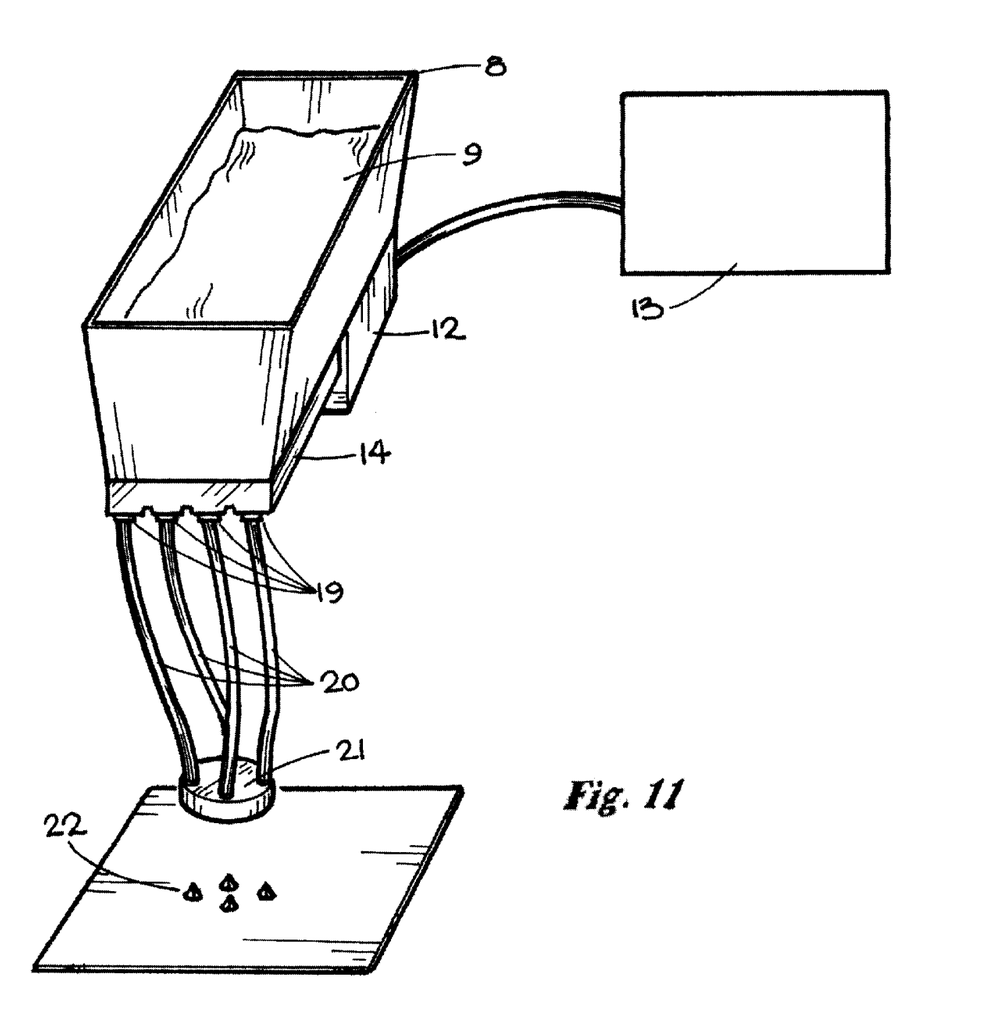
FIG. 11 shows an additional embodiment of the shutter valve dispenser depositing four equal amounts on a surface.

FIG. 11 shows another embodiment of the shutter valve dispenser, having a container 8, flowable material 9, pump 14, drive mechanism 12 and controller 13. Hoses 20, are attached to each output port 19, to a dispense nozzle 21. The dispense nozzle in this case deposits four equal amounts of material 22. The hose lengths, bends, and food consistency have very little effect on the amount dispensed because each dispense is controlled by a separate positive displacement piston.

Figure 12:
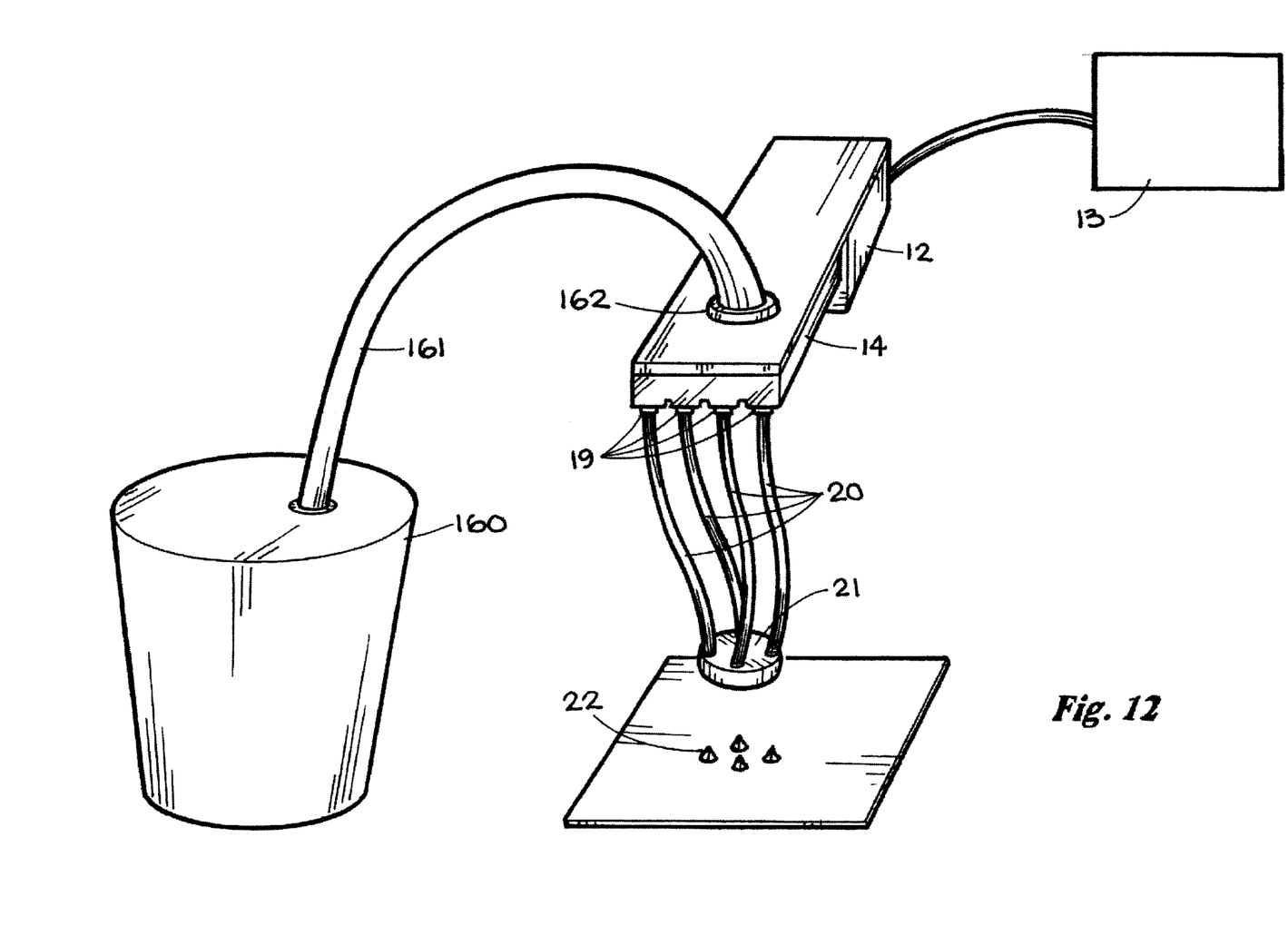
FIG. 12 illustrates an arrangement similar to that of FIG. 11, except that a remote container and feed hose are utilized.

FIG. 12 is similar to FIG. 11, the difference being the remote container 160, the feed hose 161 and the hose coupling 162 to the shutter valve dispenser. The sealing requirements between the piston, housing and shutter valve of this pump are far greater due to the negative pressure required to draw the flowable material from the container.

Figures 13A, 13B, 13C:
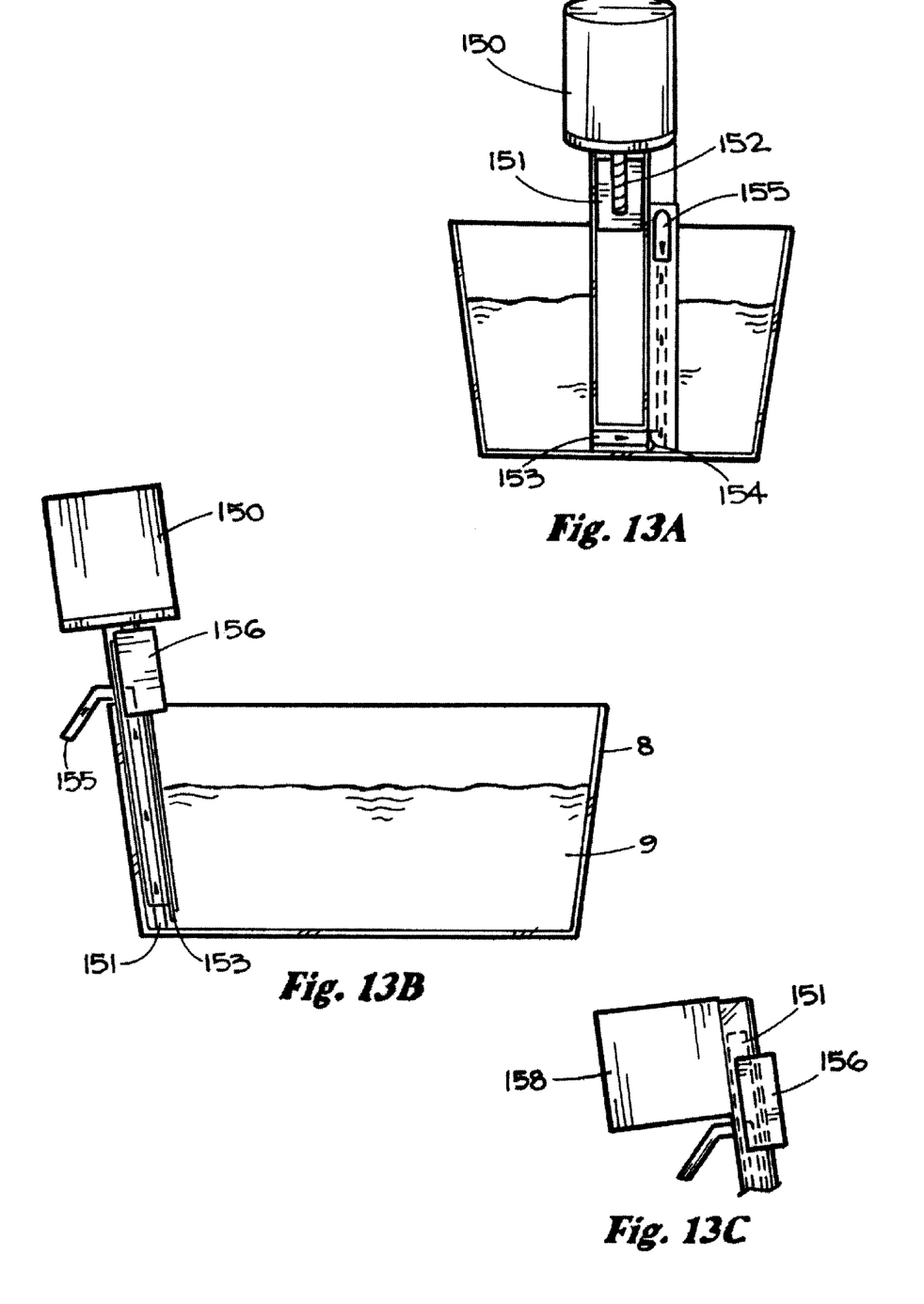
FIGS. 13A and 13B presents an end elevation view and side elevational view of a configuration in which the major components are vertically disposed.
FIG. 13C shows an arrangement in which the drive motor means is rotated to a horizontal position.

FIG. 13 illustrates variants of an upright mounted embodiment. FIGS. 13A and 13B illustrate end and side elevation views of an arrangement in which drive motor means 150, shutter motor or solenoid means 156, and associated gearing and control means are mounted approximately vertically above the container holding the flowable material. After metering by shutter 153, the material is pumped upward through one-way valving means 154 and dispensed through nozzle means 155.

FIG. 13C shows a variant arrangement in which drive motor means 158 is rotated so as to be disposed normal to the linear pumping axis. Driving through the rotational angle is accomplished by conventional means such as a rack-and-pinion, or a cam drive arrangement.

It will be recognized that in all of the above embodiments, the flowable product being dispensed may be warmed, chilled, or maintained at a constant temperature within the container, and/or at an exit nozzle.

The foregoing description and drawings were given for illustrative purposes only, it being understood that the invention is not limited to the embodiments disclosed, but is intended to embrace any and all equivalents, alternatives, modifications and rearrangements of elements falling within the scope of the invention as defined by the following claims.

What I claim is:

1. An apparatus for dispensing controlled quantities of flowable product material, comprising:

container means for holding flowable products, said container means having means for porting flowable products into and out of said container means;

dispenser means for receiving said flowable products from said container means and for dispensing controlled quantities of said flowable product materials therefrom, said dispenser means comprising:

dispenser body means for defining a piston housing portion therein, and for porting said controlled quantities of flowable products into and out of said piston housing portion;

piston means for pumping controlled quantities of flowable products out of said piston housing portion; and shutter valve means for variable closure of said piston housing portion whereby the flow of said flowable product from said container means is controlled;

shutter drive means for positioning said shutter valve means so as to meter the flow of controlled quantities of flowable product material from said dispenser means;

piston drive means for stroking said piston means so as to cyclically draw a controlled amount of flowable product material from said container means, and for cyclically dispensing of said controlled quantities of flowable product material from said dispenser means; and computer control means for independent positioning of said piston and shutter valve means in accordance with a selected sequencing program.

2. The apparatus for dispensing controlled quantities of flowable product materials, as recited in claim 1, wherein said piston and shutter drive means comprise rotational motion servomechanism means for increased angular accuracy for each said drive.

3. The apparatus for dispensing controlled quantities of flowable product materials, as recited in claim 1, wherein said piston means comprises a plurality of separate piston means for connection to a single piston drive means.

4. The apparatus for dispensing controlled quantities of flowable product materials, as recited in claim 3, wherein said shutter valve means comprises a plurality of separate shutter valve means for attachment to a single shutter valve drive means.

5. The apparatus for pumping controlled quantities of flowable product material, as recited in claim 4, wherein said piston means and housing means have a plurality of mating compartments.

6. The apparatus for dispensing controlled quantities of flowable product materials, as recited in claim 5, wherein said flowable material comprises a plurality of materials disposed in a plurality of container means.

7. The apparatus for pumping controlled quantities of flowable product material, as recited in claim 1 wherein said piston means comprises a plurality of separate pistons connected to a plurality of piston drive means.

8. The apparatus for dispensing controlled quantities of flowable product materials, as recited in claim 7, wherein said shutter valve means comprises a plurality of shutter valves attached to said plurality of shutter valve drive means.

9. The apparatus for dispensing controlled quantities of flowable product materials, as recited in claim 8, wherein said piston housing means comprises piston cylinders with different volumes.

10. The apparatus for pumping controlled quantities of flowable product material, as recited in claim 9, further comprising multiple hose dispensers.

11. The apparatus for dispensing controlled quantities of flowable product materials, as recited in claim 1, wherein said piston and shutter drive means comprise linear motion servomechanism means for increased linear positional accuracy for each said drive.

* * * * *